(12) United States Patent  (10) Patent No.: US 7,631,817 B2
Thompson et al.  (45) Date of Patent: Dec. 15, 2009

(54) SPRAY BOOM LOCK ASSEMBLY (75) Inventors: Dennis G. Thompson, Saskatoon (CA);
Dennis W. Chahley, Martensville (CA)

(73) Assignee: CNH Canada, Ltd. (CA)

( * ) Notice: Subject to any disclaimer, the term of this patent is extended or adjusted under 35 U.S.C. 154(b) by 801 days.

(21) Appl. No.: 11/096,368

(22) Filed: Apr. 1, 2005

(65) Prior Publication Data
US 2006/0245904 A1  Nov. 2, 2006

(51) Int. Cl.
B05B 1/20 (2006.01)
B05B 15/08 (2006.01)
A01G 25/09 (2006.01)
B05B 1/00 (2006.01)
B05B 3/00 (2006.01)

(52) U.S. Cl. .............. 239/159; 239/587.1; 239/587.4; 239/167; 239/600; 239/172; 239/722; 180/9.4; 180/53.3; 280/406.2; 280/416.2; 280/455.1; 280/491.5; 280/486

(58) Field of Classification Search ........... 239/159, 239/600, 587.1, 587.4, 167, 172, 722; 180/9.4, 180/53.3; 280/406.2, 416.2, 455.1, 491.5, 280/486
See application file for complete search history.

(56) References Cited
U.S. PATENT DOCUMENTS

| | | | |
|---|---|---|---|
| 1,470,246 A | 10/1923 | Willis et al. | |
| 1,581,648 A * | 4/1926 | Leake | 280/496 |
| 2,793,909 A | 5/1957 | Gerbracht | |
| 3,774,693 A * | 11/1973 | Orthman | 172/311 |
| 3,967,684 A | 7/1976 | Haverdink | |
| 4,039,147 A * | 8/1977 | Hugg | 239/167 |
| 4,074,766 A * | 2/1978 | Orthman | 172/311 |
| 4,197,999 A * | 4/1980 | Lammers | 239/166 |
| 4,379,522 A | 4/1983 | Elliott et al. | |
| 4,607,708 A | 8/1986 | Landphair et al. | |
| 4,660,654 A * | 4/1987 | Wiebe et al. | 172/776 |
| 4,799,563 A * | 1/1989 | Yukino | 180/14.4 |
| 4,867,245 A * | 9/1989 | Stevens | 172/311 |
| 4,923,017 A * | 5/1990 | Meek et al. | 172/776 |
| 5,178,328 A * | 1/1993 | Broyhill | 239/168 |
| 5,630,547 A | 5/1997 | Klemenhagen et al. | |
| 5,918,808 A * | 7/1999 | Weddle | 239/1 |
| 5,927,606 A * | 7/1999 | Patterson | 239/167 |
| 5,950,926 A | 9/1999 | Chahlev et al. | |
| 5,992,759 A * | 11/1999 | Patterson | 239/167 |
| 6,012,648 A | 1/2000 | Morris | |
| 6,048,161 A * | 4/2000 | Merlo et al. | 414/680 |

(Continued)

Primary Examiner—Len Tran
Assistant Examiner—Steven Cernoch
(74) Attorney, Agent, or Firm—Rebecca L. Henkel; John William Stader; Michael G. Harms (57) ABSTRACT A lock assembly operable to secure a lift linkage associated with moving a boom assembly between a lowered, operative position and a raised, inoperative position is provided. The lock assembly includes a lock pin mounted at a carrying frame interconnected between a lift linkage and the boom assembly. The lock assembly also includes a lock plate mounted at the lift linkage. In the raised position of the lift linkage, the lock plate includes a slot configured to align so as receive the lock pin. Once aligned, the boom is pivoted toward the folded, stowed position. As the boom pivots, the boom pushes the lock pin through the slot. The lift linkage is then lowered to seat the lock pin in the slot and thereby secure the lift linkage and supported boom in the raised, folded position.

12 Claims, 5 Drawing Sheets

U.S. PATENT DOCUMENTS

| | | |
|---|---|---|
| 6,059,201 A | 5/2000 | Weddle |
| 6,343,661 B1 * | 2/2002 | Thompson et al. .......... 172/444 |
| 6,647,904 B1 | 11/2003 | Mariman et al. |
| 6,789,746 B2 * | 9/2004 | Guesdon .................... 239/167 |
| 6,834,223 B2 * | 12/2004 | Strelioff et al. .............. 701/50 |
| 7,429,003 B2 * | 9/2008 | Thompson et al. .......... 239/167 |
| 7,431,221 B2 * | 10/2008 | Thompson et al. .......... 239/166 |
| 2003/0121675 A1 * | 7/2003 | Gingerich ................... 172/274 |
| 2004/0158381 A1 | 8/2004 | Strelioff et al. |
| 2005/0056435 A1 * | 3/2005 | Price et al. .................... 169/52 |
| 2006/0255175 A1 * | 11/2006 | Thompson et al. .......... 239/168 |

* cited by examiner

SPRAY BOOM LOCK ASSEMBLY

FIELD OF THE INVENTION

The invention relates to a lock assembly for a boom assembly of an agricultural sprayer, and more specifically, relates to a lock assembly operable to secure a lift linkage associated with moving the boom assembly between a lowered, operative position and a raised, inoperative position to be folded and ready for transport.

BACKGROUND OF THE INVENTION

Boom assemblies are commonly used on agricultural vehicles or towed implements (e.g., sprayers or planters, etc.) to dispense seed, fertilizer, insecticide, herbicide, etc. and other miscellaneous agricultural materials. The typical boom assembly is configured to pivot or fold between operative and inoperative positions relative to the boom support vehicle. In its operative position, the boom assembly commonly extends in a laterally outward direction from the boom support vehicles up to a distance of ninety-feet or larger such that the agricultural applicator covers a large surface area with each pass across a field. The weight of the boom assembly generally correlates with its operative length.

Upon completing distribution of the agricultural materials to the field, a conventional lift mechanism (e.g., manual, hydraulic, pneumatic, etc.) is employed in a known manner to raise each of the booms to a raised, inoperative position. Once raised, manually or automatically operated pivot mechanisms (e.g. hydraulic, pneumatic, etc.) are employed to swing, pivot or fold each of the booms to a folded position for transport. The preferred folded position of the boom assembly is generally parallel to the direction of travel of the support vehicle such that each of the booms and the support vehicle has a narrow profile for ready transport from the field to a roadway.

When moved to a folded, stowed position for transport, typical sprayers use various means and methods to positively lock the lift mechanism associated with moving the boom assemblies from the lowered, operative position to the raised, inoperative position. Operators desire the lift mechanism to be positively locked so that the booms are safely secured in the raised, inoperative position in the event of a mechanism failure during travel on the roadway. A certain known lock assembly uses a pilot-operated check valve mounted at a lift cylinder associated with a hydraulic lift mechanism for moving the booms. Another known lock assembly utilizes a hydraulically-actuated mechanical lock. Yet, still another lock assembly includes resting points or seats located at both the front and rear of each boom and configured to secure the booms in case of failure of the lift mechanism.

However, these certain known lock assemblies employed to secure the position of the lift linkage and supported boom assembly have drawbacks. For example, the above-described hydraulically piloted or actuated lock assemblies can be costly. In regard to the resting structures, providing a resting point structure at the rear of the boom adds undesirable weight and complexity to the design of the towed implement or vehicle.

Therefore, there is a need or desire for a low-cost locking assembly that is overcomes the foregoing difficulties and drawbacks of the prior art. The lock assembly should also be simple and reliable to operate and economical to manufacture. In addition, the lock assembly should be configured to be utilized with a wide variety of vehicles or towed implements in addition to those related to agriculture.

SUMMARY OF THE INVENTION

The present invention provides an assembly for and a method of locking a lift linkage associated with raising a boom assembly mounted on a towed implement or vehicle that meets the desires and needs described above. The lock assembly of the present invention thus enhances the ready transition of the boom assembly from a extended, lowered, operative position to a raised, inoperative position to be pivoted to a folded, stowed position ready for transport.

In a first embodiment of the present invention, a lock assembly for an implement having a lift mechanism operatively connected to move a carrying frame in support of a boom between a lowered, operative position and raised, inoperative position is provided. The lock assembly comprises a lock pin mounted at the carrying frame, and a lock plate mounted at the lift linkage. The lock plate includes an elongated slot configured to receive the lock pin in a raised position. When the lift linkage raises the carrying frame and the boom to the raised position, the slot of the lock plate aligns to receive the lock pin at the carrying frame. As the boom pivots toward the folded position for transport, the boom pushes the lock pin through the slot to a locked position so as to secure the lift linkage and the boom in the raised, inoperative position.

The preferred lock assembly includes a first bracket and a second bracket in support of the lock pin from the carrying frame, first bracket having a first opening and the second bracket having a second opening each to receive the lock pin therethrough. As the lift linkage raises the boom, the first and second brackets receive the plate therebetween and the first and second openings align with the slot in the lock plate. Once lift linkage has fully raised the boom, a pivot mechanism moves the boom from the extended position to a folded position. As the pivot mechanism moves the boom toward the folded position, the boom urges or pushes the lock pin through the slot in the lock plate, securing the lift linkage and the boom. The lift linkage then lowers the carrying frame and the boom to seat the preferred lock pin in the slot such that the lock pin supports at least a portion of the weight of the boom on the lock plate. The lock assembly further includes a spring configured to bias the lock pin toward an unlocked position, and a support member attached at the lock pin and positioned to engage one end of the spring. As the pivot mechanism moves the boom toward the extended position and the lift linkage slightly raises the boom, the lock pin disengages from the lock plate and is biased by the spring to retract from the slot such that the lift linkage is allowed to operate freely to lower the boom to the lowered, operative position.

In another embodiment, the present invention provides an agricultural sprayer that includes a carrying frame supported on a vehicle or towed implement, a boom pivotally coupled to the carrying frame and movable between an extended, position and a folded, stowed position for transport, and a lift linkage configured to move the carrying frame and pivotally coupled boom between a lowered, operative position and a raised, inoperative position. The agricultural sprayer further includes a lock assembly that comprises a lock pin mounted at the carrying frame, and a lock plate mounted at the lift linkage. In the raised position of the lift linkage, the lock plate includes a slot configured align so as to receive the lock pin. As the boom is moved forward toward a folded, stowed position, the boom pushes the lock pin through the slot and secures the lift linkage and supported boom in the raised, inoperative position.

In accordance with another aspect of the invention, a method of locking a lift linkage operatively connected to move a carrying frame and attached boom assembly from a lowered, operative position to a raised, inoperative position is provided, substantially in accordance with the foregoing summary.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figures 1, 10, 11:
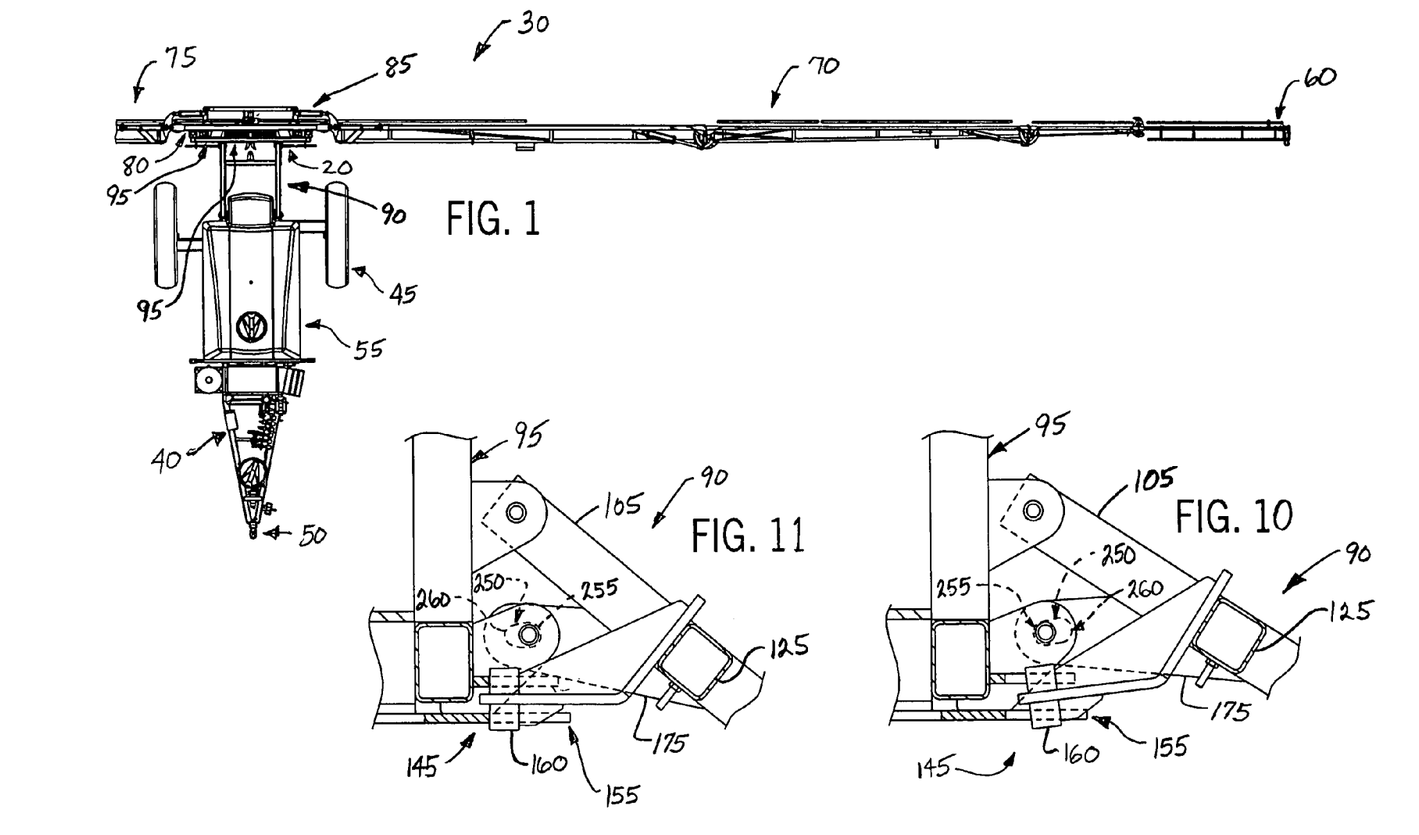
FIG. 1 illustrates a partial top plan view of a lock assembly of the present invention employed on an agricultural sprayer supporting a boom assembly, the boom assembly in an extended, operative position.
FIG. 10 illustrates the lock assembly of the present invention, the lock pin received through the slot in the lock plate.
FIG. 11 illustrates the lock assembly of the present invention, the lock pin in a seated, locked position.
Figure 2:
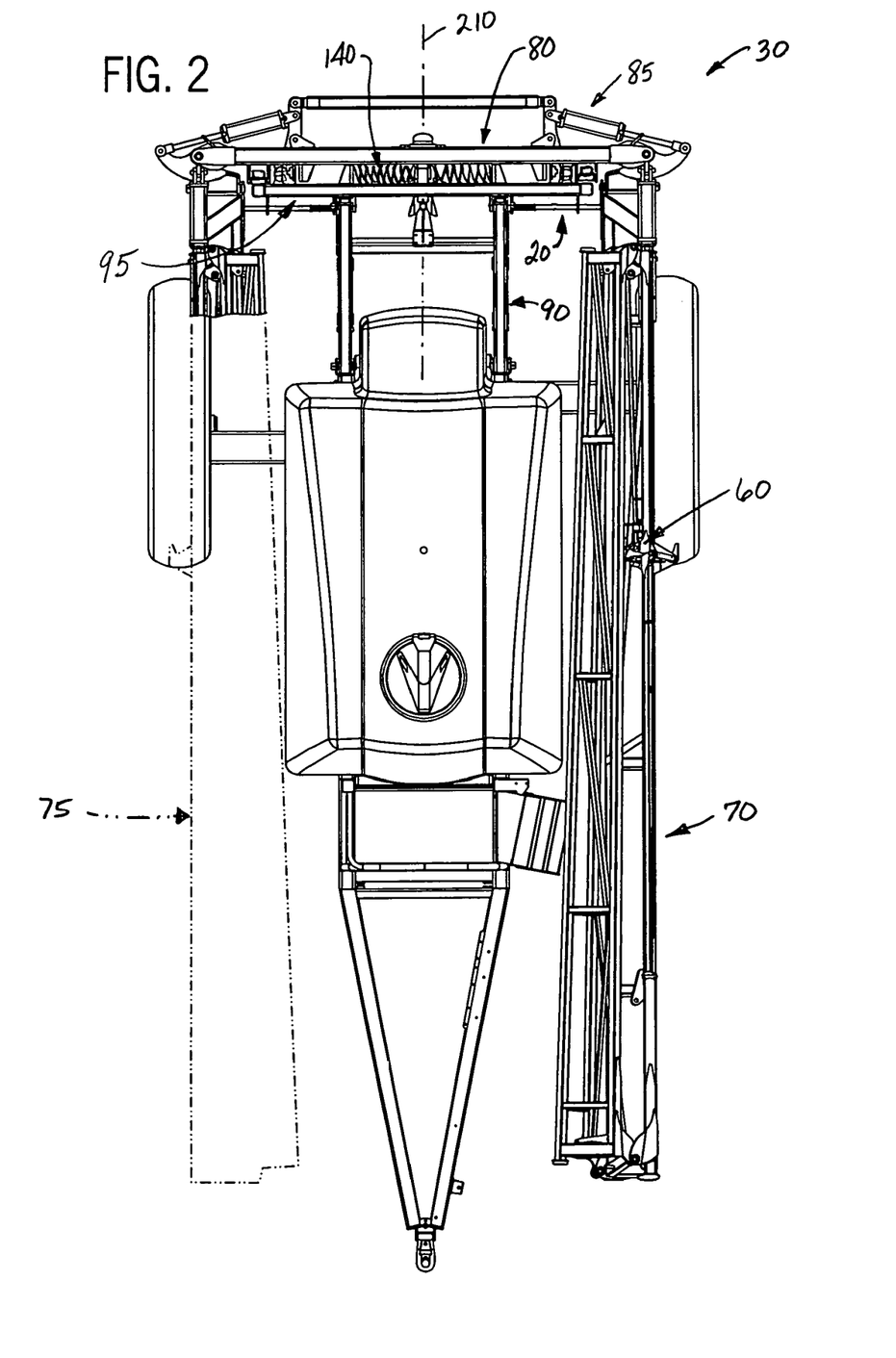
FIG. 2 illustrates a top plan of the lock assembly and agricultural sprayer shown in FIG. 1, the boom assembly in a folded, inoperative position.

FIGS. 1 and 2 show a lock assembly 20 in accordance with the present invention employed in combination with a boom assembly 30 mounted on a boom support implement 35 or vehicle. The illustrated boom support implement 35 is a conventional agricultural sprayer implement of a type commonly used to apply crop pesticides, nutrients or animal/human waste (sludge) to soils, typically before and after planting in the spring and/or after harvest in the fall.

The illustrated boom support implement 35 generally includes a mainframe structure 40 supported on plurality of oversized wheel assemblies 45 and a hitch 50 operable to be towed by a tow vehicle (not shown) across a field. The main frame 40 is in support of a reservoir or storage tank 55 in fluid connection with a series of nozzles 60 mounted on the boom assembly 30. With the boom assembly 30 in the extended, operative position (See FIG. 1), agricultural product is communicated in a known manner from the reservoir 55 to a series of spray nozzles 60 for distribution across a wide surface area of the field.

The boom assembly 30 generally includes a left boom 70 and a right boom 75, each mounted by the series of spray nozzles 60 in fluid connection with the reservoir 55. The boom assembly 30 also includes a stationary central frame structure 80 in pivotal support of the left and right booms 70 and 75. The left and right booms 70 and 75 each are pivotable by a conventional pivot actuator mechanism(s) 85 in a known manner so as to move the booms 70 and 75 and between the extended, operative position (See FIG. 1) and the folded, inoperative position (See FIG. 2). Although the illustrated pivot actuator mechanism 85 is hydraulic driven, it is understood that the type of pivot actuator mechanism 85 (e.g., hydraulic, pneumatic, manual, etc.) can vary.

Figure 6:
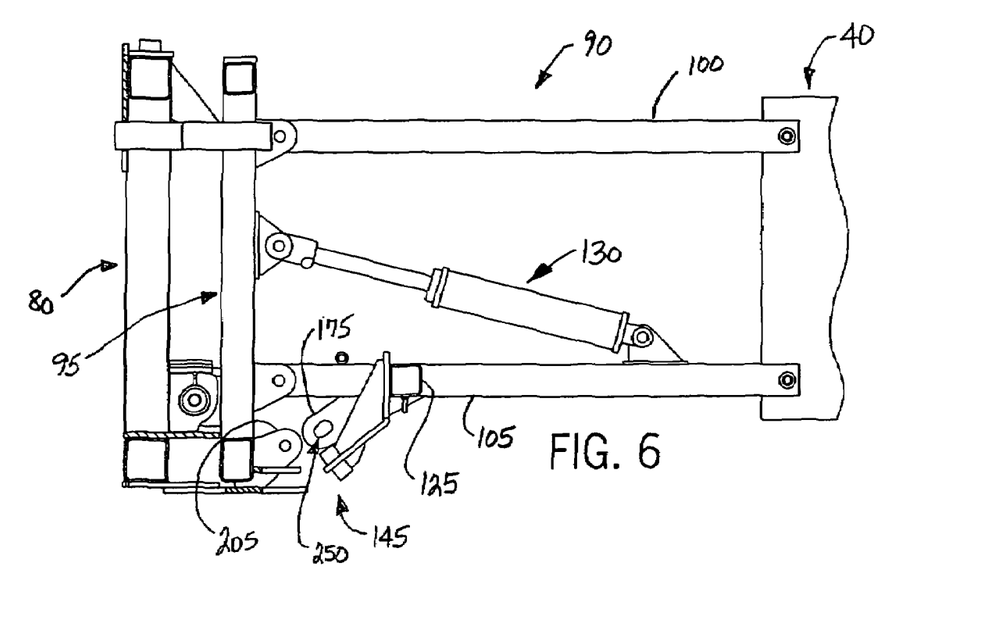
FIG. 6 illustrates a cross-section view along line 6-6 in FIG. 4.
Figure 7:
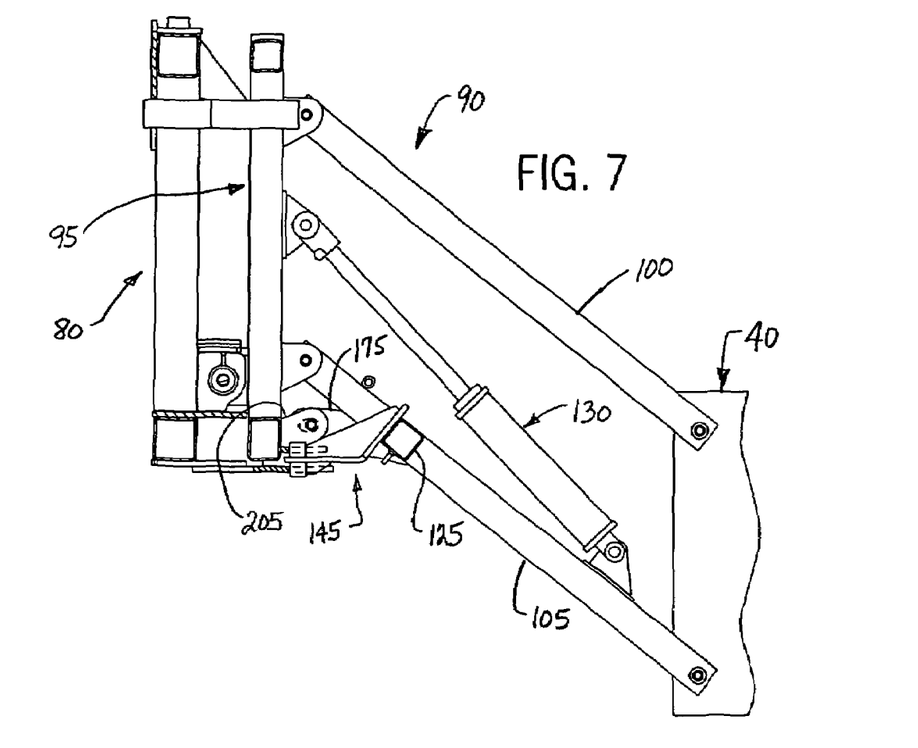
FIG. 7 illustrates a cross-section view along line 7-7 in FIG. 5.

As illustrated in FIGS. 1-3 and 6-7, the boom assembly 30 is coupled to a lift linkage 90 by a carrying frame 95. Referring specifically to FIGS. 6 and 7, the lift linkage 90 is generally operable to move the carrying frame 95 and the boom assembly 30 between the lowered, operative position (FIG. 6) and the raised, inoperative position (FIG. 7). The preferred lift linkage 90 generally includes an upper left linkage member 100 and a lower left linkage member 105, and an upper right linkage member 110 and lower right linkage member 115 (See FIG. 3). One end of each of the upper and lower left linkage members 100 and 105, respectively, and the upper and lower right linkage members 110 and 115, respectively, is pivotally attached at the carrying frame 95 about a horizontal pivot axis. The other end of the each of the upper and lower left linkage members 100 and 105 and the upper and lower right linkage members 110 and 115 is pivotally attached at the main frame 40. The lift linkage 90 also includes a central linkage member 125 fixedly interconnected between the left and right lower linkage members 105 and 115. A conventional lift actuator mechanism 130 is configured to drive or move the lift linkage 90 so as to lift the carrying frame 95 and supported boom assembly 30. Once the lift actuator mechanism 130 and lift linkage 95 have raised the boom assembly 30 to the raised, inoperative position, the conventional pivot actuator mechanism 85 is operable to move the boom assembly 30 to the folded, inoperative position for transport, as shown in FIG. 2. Although the illustrated lift actuator mechanism 130 is hydraulic-driven, it is understood that the mechanism type (e.g., hydraulic, pneumatic, manual, etc.) can vary.

Figure 4:
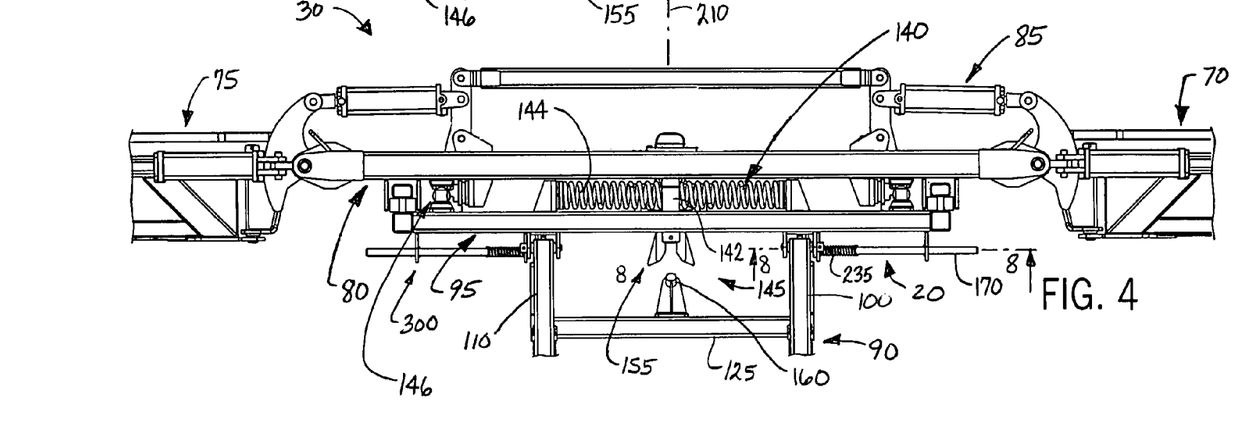
FIG. 4 illustrates a detailed top view of the carrying frame in support of the boom assembly in a lowered and extended, operative position.
Figure 5:
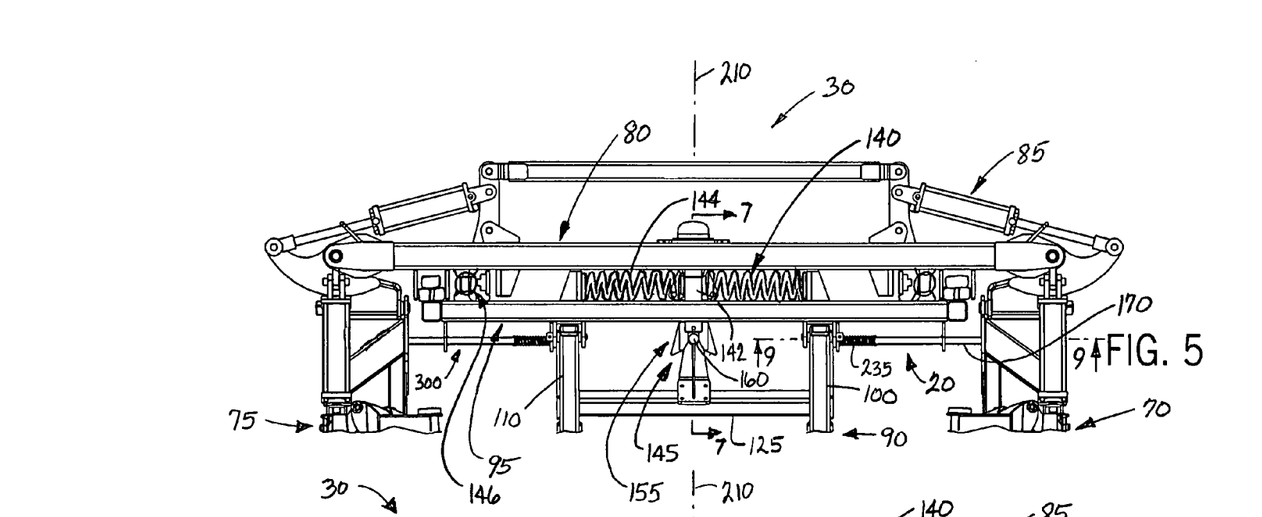
FIG. 5 illustrates a detailed top view of the carrying frame in support of the boom assembly in a raised and folded, inoperative position.

Referring now to FIGS. 2 and 4-5, the carrying or stationary frame 95 is generally a conventional tubular frame structure coupled in pivotal support of the boom assembly 30 to the lift linkage 90. It should be understood that other types of carrying frames can employed in support of the boom assembly 30 and is not limiting on the invention.

Referring specifically to FIGS. 4 and 5, a suspension arrangement 140 operatively connects the carrying frame 95 and the boom assembly 30 in a known manner such that the boom assembly 30 is operable to roll or rotate independent of the carrying frame 95 and the lift linkage 90. Thereby, the suspension arrangement 140 is operable in a known manner to maintain a uniform distance or parallel altitude between the booms 70 and 75 of the boom assembly 30 and the ground. The illustrated suspension arrangement 140 includes a single pivotal connection 142 in combination with one or more springs 144 or dampers or the shocks 146 or the like operatively connected between the boom assembly 30 and the carrying frame 95 and attached lift linkage 90. The pivot connection 142 is configured to allow the boom assembly 30 to swing in a pendulum type manner independent of the carrying frame 95.

Referring to FIGS. 4-5 and 10-11, a suspension lock assembly 145 is configured to restrain the suspension arrangement 140 such that the boom assembly 30 does not roll or rotate with respect to the lift linkage 90 and carrying frame 95. The preferred embodiment of the suspension lock assembly 145 is illustrated in U.S. patent application Ser. No. 11/097,000 entitled "SPRAY BOOM SUSPENSION LOCK ASSEMBLY", filed simultaneously with this application and hereby incorporated herein by reference in its entirety. The suspension lock assembly 145 generally includes a bracket assembly 155 configured to seat a lock pin 160 attached at the central linkage member 125 of the lift linkage 90. Once the lock pin 160 is seated in the bracket assembly 155, the boom assembly 30 is balanced such that the left and right booms 70 and 75 can be pivoted to the proper folded, inoperative positions to be secured for transport by the transport lock assembly 20 of the present invention. Although the transport lock assembly 20 of the invention does not require the suspension lock assembly 145, the combined use of both lock assemblies 20 and 145 enhances the smooth transition to the proper folded, stowed position of the boom assembly 30.

Figure 3:
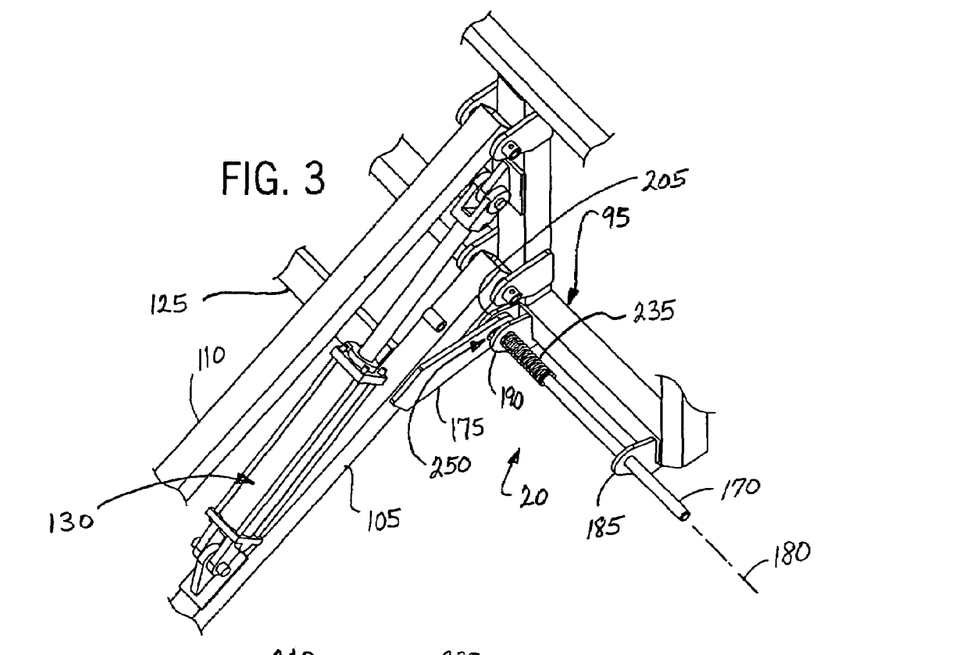
FIG. 3 illustrates a detailed perspective view of the lock assembly of the present invention.
Figure 8:
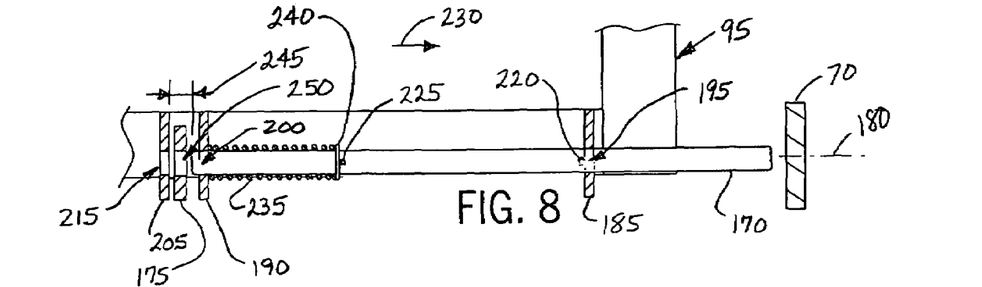
FIG. 8 shows a detailed side elevation view along line 8-8 in FIG. 4, illustrating the lock assembly in an unlocked position.
Figure 9:
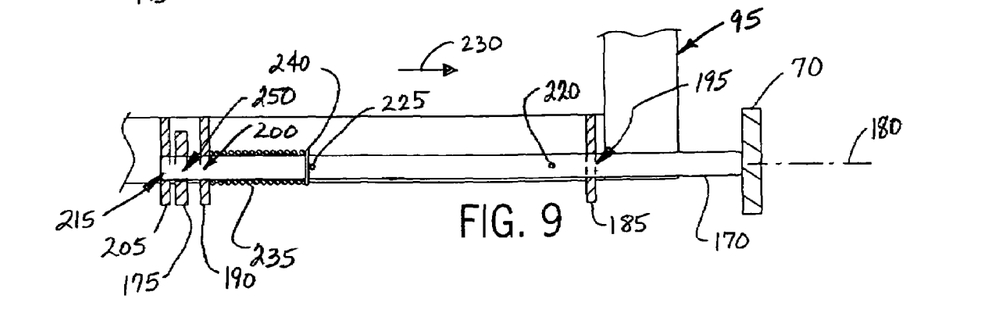
FIG. 9 shows a detailed side elevation view along line 9-9 in FIG. 5, illustrating the lock assembly in a seated, locked position.

Referring to FIGS. 3 and 8-9, upon the lift linkage 90 raising the carrying frame 95 and boom assembly 30 to the raised position, the transport lock assembly 20 is operable to positively lock and secure the lift linkage 90 and the boom 70 supported thereon in the folded, stowed position. The preferred transport lock assembly 20 generally includes a lock pin 170 mounted at the carrying frame 95 and configured to selectively engage a lock plate 175 mounted at the lift linkage 90 so as to secure the raised position of the lift linkage 90 and the boom 70.

Still referring to FIGS. 3 and 8-9, the preferred lock pin 170 generally comprises an elongated rod member having a longitudinal axis 180. The lock pin 170 is supported by a pair of lock pin support brackets 185 and 190 in a generally horizontally aligned position. The first bracket 185 is spaced from the second bracket 190. Referring specifically to FIGS. 8 and 9, the first bracket 185 includes a first opening 195 and the second bracket 190 includes a second opening 200 generally aligned with the first opening 195 so as to receive the lock pin 170 therethrough. A third support bracket 205 is located laterally inward from the second bracket 190 relative to a central axis 210 (See FIG. 2) of the boom assembly 30, opposite the first bracket 185. The third support bracket 205 is of construction similar to the first and second brackets 175 and 190 described above, and includes a third opening 215 generally aligned with the first and second openings 195 and 200 to receive the pin 170 therethrough. The first, second and third brackets 185, 190 and 205, respectively, can be an integral piece or separated structures.

Still referring specifically to FIGS. 8 and 9, the lock pin 170 further includes a first retainer 220 and a second retainer 225 spaced from the first retainer member 220. Both retainer members 220 and 225 are generally aligned relative to the longitudinal axis 180 of the lock pin 170. The first retainer member 220 is configured to engage the first bracket 185 and prevent the lock pin 170 from sliding or slipping out through the first opening 195 in a laterally outward direction (illustrated by the directional arrow and reference 230) from the first bracket 185.

The lock assembly 20 further includes a spring 235 configured to bias the lock pin 170 toward an unlocked position and in the laterally outward direction 230. The preferred spring 235 is a compression-type. The first end of the spring 235 is engaged against an outer face of the second bracket 190. A support member 240 (e.g., a washer) is mounted on the lock pin 170. The support member 240 is configured to engage against the second end of the spring 235 under the restraint of the second retainer member 225. The spring 235 is of a diameter such that it is mounted to receiver the lock pin 170 therethrough and restrained from slipping through the opening 200 in the second bracket 190 and over the support member 240. When not under any external forces aside of the bias of the spring 235, the lock pin 170 is restrained in an unlocked position shown in FIG. 8 such that it extends through the first opening 195 of the first bracket 185 and at least partially through the second opening 200 of the second bracket 190. Yet, the lock pin 170 does not extend through the third opening 215 in the third bracket 205. Rather, the end of the lock pin 170 and/or second bracket 190 defines a gap 245 (See FIG. 8) with the third bracket 205.

Referring to FIGS. 3 and 6-11, the preferred lock plate 175 is an elongated plate member fixedly attached at the lower linkage member 105 of the lift linkage 90. Referring specifically to FIGS. 10 and 11, the lock plate 175 generally includes an elongated slot 250 having a first end 255 opposite a second end 260. FIG. 10 illustrates the lock pin in a seated position against the second end of the slot In operation, assume for example that the lift linkage 90 holds the carrying frame 95 and the booms 70 and 75 of the boom assembly 30 in a lowered, operative position for spraying and distribution of product across the field. As the implement 35 is towed across the rough terrain associated with field operation, the suspension arrangement 140 is operable to maintain a uniform distance or parallel attitude between each of the booms 70 and 75 of the boom assembly 130 and the ground, and thereby enhances spray coverage of product across the field. When finished in the field, the operator activates the lift actuator mechanism(s) 130 to cause the lift linkage 90 to raise the attached carrying frame 95 and boom assembly 30 to the raised, inoperative position. As the lift linkage 90 raises the carrying frame 95 and the boom assembly 30, the suspension lock assembly 145 moves into a seated, locked position such that the boom assembly 30 is balanced from rotating with respect to the lift linkage 90. Although this step of locking the suspension arrangement 140 is not required to engage the transport lock assembly 20, this step enhances the smooth transition in securing the booms 70 and 75 in the proper position to make ready for transport.

In addition, as shown in FIGS. 3 and 8-9, movement of the lift linkage 90 and the carrying frame 95 and the supported boom 70 to the raised position causes the lock plate 175 to move into the gap 245 between the lock pin 170 and/or second bracket 190 and the third support bracket 205. Referring to FIG. 8, the slot 250 of the lock plate 175 is configured to align with the first, second and third openings 195, 200 and 215, of the first, second and third brackets 185, 190 and 205, respectively, so as to receive the lock pin 170 therethrough.

Once the slot 250 is aligned with the openings 195, 200 and 215, the pivot actuator mechanism 85 moves the boom 70 in a forward direction toward the folded position (See FIG. 2). Referring to FIGS. 5 and 9, as the boom folds in the forward direction, the boom 70 engages against the end of the lock pin 170 pin and moves the lock pin 170 in an inward direction toward the central axis 210 of the boom assembly 30 against the bias of the spring 235. Referring now to FIG. 9, continued movement of the boom 70 forces the pin 170 through the slot 250 in the lock bracket 175 and the opening 215 in the third bracket 205. Once the lock pin 170 is inserted through the slot 250 and the opening 215, the lift linkage 90 and the boom 70 are lowered until the lock pin 170 is seated at the end 260 of the slot 250, as shown in FIG. 10. Referring to FIG. 10, once the lock pin 170 is seated in the slot 250, the lock pin 170 is operable to support at least a portion of the weight of the boom 70 against the lock plate 175 and the brackets 185, 190 and 205 in a manner that secures the raised position of the lift linkage 90 and the boom 70 in the folded, stowed position.

When moving the boom 70 from the folded, stowed position described above, the operator raises the lift linkage 90 via the lift actuator mechanism 130 so as to unseat the lock pin 170 inserted in the slot 250 of the lock plate 175. The operator pivots the boom 70 via the pivot actuator mechanism so as to move the boom 70 toward the extended position. As the boom 70 pivots outward, the spring 235 is operable to bias the lock pin 170 to retract from the slot 250 of the lock plate 175 as well as from the third opening 210 of the third bracket 205. Once the lock pin 170 is retracted from the opening 210 of the third bracket 205 and from the slot 250 of the lock plate 175, the lift linkage 90 is allowed to operate freely to move the boom 70 from the raised position to the lowered, operative position.

Referring to FIGS. 4 and 5, it should be understood to those skilled in the art that the foregoing description of the transport lock assembly 20 in operative combination with the boom 70 applies with equal force to a transport lock assembly 300 in operative engagement with the boom 75. Therefore, although not described in detail, it is understood that the transport lock assembly 300 is generally constructed and operable to secure the boom 75 in a manner similar to the transport lock assembly 20 in securing the boom 70, as described above.

While the invention has been shown and described with respect to particular embodiments, it is understood that alternatives and modifications are possible and are contemplated as being within the scope of the present invention. For example, although the above described lock assembly 20 is described with reference to an agricultural sprayer, one skilled in the art will recognize that the present invention is not so limited. A wide variety of boom support vehicles and towed implements could include the transport lock assembly 20 constructed in accordance with the invention. In addition, although a certain lift linkage 90 is shown operatively connected to move the carrying frame 95 and the boom assembly 30, it should be understood that the transport lock assembly 20 of the present invention can be employed to restrain a wide variety of lift linkages 95 in support of the boom assembly 30 and is not limiting on the invention.

Many changes and modifications could be made to the invention without departing from the spirit thereof. The scope of these changes will become apparent from the appended claims.

We claim:

1. A boom lock assembly for an agricultural sprayer, the sprayer having a four bar linkage lift linkage for raising a carrying frame in support of a boom from a lowered, operative position to a raised, inoperative position for the boom to pivot from an extended position to a folded position for transport, comprising:
    said four bar parallel lift linkage includes an upper and lower link member;
    wherein one end of said upper and lower link member is pivotally attached to a main frame;
    wherein opposing end of said upper and lower link member is attached to said carrying frame;
    a lift actuator is connected to a lower end of said lower link member and connected to said carrying frame;
    a lock pin mounted at the carrying frame;
    a compression spring is mounted on said lock pin;
    a support member attached at the lock pin and positioned to engage one end of the spring;
    a lock plate mounted at an upper end of said lower link member, the lock plate having an elongated slot;
    wherein upon the four bar parallel lift linkage raising the carrying frame and the boom to the raised position, the slot of the lock plate at the four bar parallel lift linkage aligns to receive the lock pin at the carrying frame, and
    wherein as the boom pivots about a vertical axis and swings the boom horizontally toward the folded position, the boom urges the lock pin in a linear motion through the slot to a locked position so as to secure the four bar parallel lift linkage and the boom in the raised position;
    wherein said compression spring biases the lock pin to an unlocked position;
    wherein upon said boom pivoting from the folded position toward the extended position, the compression spring biases the lock pin to retract from the slot of the lock plate such that the lift linkage is allowed to operate freely.

2. The boom lock assembly of claim 1, wherein as the lift linkage lowers the carrying frame and the boom from the raised and folded position, the lock pin moves to a seated position in the elongated slot in support of at least a portion of the weight of the boom and the carrying frame against the lock plate.

3. The boom lock assembly of claim 1, further comprising a first bracket and a second bracket in support of the lock pin at the carrying frame, the first bracket having a first opening and the second bracket having a second opening each configured to receive the lock pin therethrough.

4. The boom lock assembly of claim 3, further comprising a third bracket having a third opening, the third bracket attached at the carrying frame located adjacent to the second bracket, wherein the second and third brackets are located to receive the lock plate therebetween when the carrying frame and the boom are lifted to the raised position, and wherein in the raised position, the elongated slot is configured to align with the second opening of the second bracket and the third opening of the third bracket.

5. The boom lock assembly of claim 4, wherein in the locked position, the lock pin extends through the first opening in the first bracket, the second opening in the second bracket, the third opening in the third bracket, and the elongated slot of the lock plate.

6. The boom lock assembly of claim 1, further comprising a first bracket and second bracket in support of the lock pin, and a first retainer member and a second retainer member configured to restrain the lock pin between the first and second brackets against the bias of the spring.

7. An agricultural sprayer, comprising:
    a carrying frame;
    a boom supported on the carrying frame and movable between an extended position and a folded position for transport;
    a four bar parallel lift linkage pivotally coupled to move the carrying frame and the boom between a lowered, operative position and a raised, inoperative position;
    said four bar parallel lift linkage includes an upper and lower link member;
    one end of said upper and lower link member is pivotally attached to a main frame;
    opposing end of said upper and lower link member is attached to said carrying frame;
    a lock assembly comprising:
        a lock pin mounted at the carrying frame;
        a compression spring is mounted on said lock pin;

a support member attached at the lock pin and positioned to engage one end of the spring a lock plate mounted at an upper end of said lower link member of the lift linkage, the lock plate having an elongated slot;

wherein when the four bar parallel lift linkage raises the carrying frame and the boom to the raised position, the slot of the lock plate at the four bar parallel lift linkage aligns to receive the lock pin in a linear motion at the carrying frame, wherein as the boom moves about a vertical axis and swings the boom horizontally from the extended position in a forward direction toward the folded position, the boom pushes the lock pin through the slot of the lock plate to a locked position so as secure the four bar parallel lift linkage and the boom in the raised position;

wherein said compression spring biases the lock pin to an unlocked position; and wherein upon said boom pivoting from the folded position toward the extended position, the compression spring biases the lock pin to retract from the slot of the lock plate such that the lift linkage is allowed to operate freely.

8. The agricultural sprayer of claim 7, wherein the elongated slot includes a first end opposite a second end, and wherein upon the lift linkage lowering the carrying frame and the boom from the raised and folded position, the lock pin engages against one of the first and second ends of the elongated slot such that the lock pin supports at least a portion of the weight of the boom against the lock plate.

9. The agricultural sprayer of claim 7, wherein the lock pin is supported at the carrying frame by a first bracket and a spaced apart second bracket both attached at the carrying frame, the first bracket having a first opening and the second bracket having a second opening each to receive the lock pin therethrough.

10. The agricultural sprayer of claim 9, further comprising a third bracket having a third opening and that is attached at the carrying frame, the second and third brackets located to receive the lock plate therebetween when the carrying frame and the boom are lifted to the raised position, and wherein in the raised position, the elongated slot aligns with the second opening of the second bracket and the third opening of the third bracket to receive the lock pin therethrough.

11. The boom lock assembly of claim 10, wherein in the locked position, the lock pin extends through the first opening in the first bracket, the second opening in the second bracket, the third opening in the third bracket, and the elongated slot of the lock plate.

12. The agricultural sprayer of claim 7, wherein as the boom pivots from the folded position toward the extended position, the spring biases the lock pin to retract from the slot of the lock plate such that the lift linkage is allowed to operate freely to move the boom toward the lowered, operative position.

* * * * *